US008551650B2

(12) United States Patent
Kung et al.

(10) Patent No.: US 8,551,650 B2
(45) Date of Patent: Oct. 8, 2013

(54) GRAPHENE MATERIALS HAVING RANDOMLY DISTRIBUTED TWO-DIMENSIONAL STRUCTURAL DEFECTS

(75) Inventors: Harold H. Kung, Wilmette, IL (US); Xin Zhao, Evanston, IL (US); Cary M. Hayner, Evanston, IL (US); Mayfair C. Kung, Wilmette, IL (US)

(73) Assignee: Northwestern University, Evanston, IL (US)

( * ) Notice: Subject to any disclaimer, the term of this patent is extended or adjusted under 35 U.S.C. 154(b) by 19 days.

(21) Appl. No.: 13/106,210

(22) Filed: May 12, 2011

(65) Prior Publication Data

US 2012/0288750 A1  Nov. 15, 2012

(51) Int. Cl.
| | |
|---|---|
| *H01M 6/04* | (2006.01) |
| *H01M 10/00* | (2006.01) |
| *H01M 6/00* | (2006.01) |
| *H01M 4/02* | (2006.01) |
| *H01M 4/13* | (2010.01) |
| *H01M 4/58* | (2010.01) |

(52) U.S. Cl.
USPC ........ 429/188; 429/122; 429/209; 429/218.1; 429/231.8

(58) Field of Classification Search
USPC .......................................... 429/122, 188, 209
See application file for complete search history.

(56) References Cited

U.S. PATENT DOCUMENTS

| | | | |
|---|---|---|---|
| 6,087,043 A | | 7/2000 | Tossici et al. |
| 2003/0044608 A1 | | 3/2003 | Yoshizawa et al. |
| 2004/0248010 A1 | | 12/2004 | Kato et al. |
| 2007/0111106 A1* | | 5/2007 | Kim et al. ..................... 429/324 |
| 2008/0160420 A1* | | 7/2008 | Adachi et al. ................. 429/332 |
| 2008/0261116 A1* | | 10/2008 | Burton et al. .............. 429/231.8 |
| 2009/0117466 A1 | | 5/2009 | Zhamu et al. |
| 2009/0117467 A1* | | 5/2009 | Zhamu et al. .............. 429/231.8 |
| 2009/0169725 A1 | | 7/2009 | Zhamu et al. |
| 2011/0111303 A1 | | 5/2011 | Kung et al. |

FOREIGN PATENT DOCUMENTS

WO  WO 2011/057074   5/2011

OTHER PUBLICATIONS

Webster's 9th Collegiate Dictionary 1985 p. 17 1st column: adjacent.*
Lindsay (PhD Thesis, 2004 {Taken as December} University of Wollongong; Research Online per {http://ro.uow.edu.au/theses/359}).*
Paek et al. (Nano Letters 2009 vol. 9 No. 1 pp. 72-75 Web Dec. 17, 2008).*
Gomez-Navarro et al. (Nano Letters 2010 vol. 10 pp. 1144-1148 online Mar. 3, 2010).*
Lee et al Chemical Communications vol. 46 pp. 2025-2027 2010. pdf.*
Tarascon et al., Issues and challenges facing rechargeable lithium batteries, Nature, vol. 414, Nov. 15, 2001, pp. 359-367.

(Continued)

*Primary Examiner* — Patrick Ryan
*Assistant Examiner* — Aaron Greso
(74) *Attorney, Agent, or Firm* — Bell & Manning, LLC

(57) ABSTRACT

Graphene-based storage materials for high-power battery applications are provided. The storage materials are composed of vertical stacks of graphene sheets and have reduced resistance for Li ion transport. This reduced resistance is achieved by incorporating a random distribution of structural defects into the stacked graphene sheets, whereby the structural defects facilitate the diffusion of Li ions into the interior of the storage materials.

21 Claims, 3 Drawing Sheets

(56) References Cited

OTHER PUBLICATIONS

Armand et al., Building better batteries, Nature, vol. 451, Feb. 2008, pp. 652-657.

Paek et al., Enhanced cyclic performance and lithium sotrage capacity of $SnO_2$/graphene nanoporous electrodes with three-dimensionally delaminated flexible structure, Nano Lett., vol. 9, No. 1, Dec. 17, 2008, pp. 72-75.

Yang et al., Fabrication of graphene-encapsulated oxide nanoparticles: towards high-performance anode materials for lithium storage, Angew. Chem. Int. Ed., vol. 49, No. 45, Nov. 2, 2010, pp. 8408-8411.

Wu et al., Graphene Anchored with $Co_3O_4$ Nanoparticles as Anode of Lithium Ion Batteries with Enhanced Reversible Capacity and Cyclic Performance, ACS Nano, vol. 4, No. 6, May 10, 2010, pp. 3187-3194.

Lee et al., Silicon Nanoparticles-Graphene Paper Composites for Li Ion Battery Anodes, Chem. Commun. vol. 46, 2010, pp. 2025-2027.

Pan et al., Li Storage Properties of Disordered Graphene Nanosheets, Chem. Mater., vol. 21, No. 14, Jul. 6, 2009, pp. 3136-3142.

Banhart et al., Structural Defects in Graphene, ACS Nano, vol. 5, No. 1, Nov. 23, 2010, pp. 26-41.

International Search Report and Written Opinion received in PCT/US2010/055625, May 9, 2011.

Coleman et al., Defect formation in graphene nanosheets by acid treatment: an x-ray absorption spectroscopy and density functional theory study, Journal of Physics D: Applied Physics, vol. 41, Feb. 21, 2008, pp. 1-4.

International Search Report and Written Opinion received in PCT/US2011/036206, Feb. 21, 2012.

Erickson et al., Determination of the Local Chemical Structure of Graphene Oxide and Reduced Graphene Oxide, Adv. Mater., vol. 22, Aug. 17, 2010, pp. 4467-4472.

\* cited by examiner

GRAPHENE MATERIALS HAVING RANDOMLY DISTRIBUTED TWO-DIMENSIONAL STRUCTURAL DEFECTS

REFERENCE TO GOVERNMENT RIGHTS

This invention was made with government support under DE-AC02-06CH11357 awarded by Department of Energy. The government has certain rights in the invention.

BACKGROUND

The proliferation of mobile devices with large numbers of increasingly sophisticated and powerful functions has led to a rapidly increasing demand for high-power, high-capacity electrical energy storage devices. The situation will become even more acute when hybrid and battery-powered electric vehicles become a preferred mode of transportation. Currently, the combined need for high capacity and high power is met by two separate devices: a rechargeable battery for capacity and an ultracapacitor for power. A single device, such as a rechargeable battery that can operate at high power, is highly desirable because it would be lighter, simpler to control, and able to provide sustained high power.

Graphene, a two-dimensional aromatic monolayer graphite has recently been investigated with respect to rate capability and cycling stability when used in conventional electrochemical energy storage devices. The excellent tensile modulus and mechanical durability of self-supporting graphene materials eliminate the requirement for traditional inactive additives and metal foil current collectors. In addition, charge storage materials made by sandwiching high-capacity metallic or redox materials between graphene sheets have shown improved cycling stability.

Unfortunately, the practical charge storage capability of graphene based anodes in Li ion batteries at high charge/discharge rates has been constrained by the structure of graphene, which has a very high aspect ratio (i.e., it is wide, but very thin). In order to access the interior of a graphene stack, Li ions need to enter the structure at the edge of the stack and travel distances of the order of microns. Thus, at high power, when fast Li exchange between the electrolyte solution and the electrode is required, only the regions near the edge of the graphene stack are accessible.

SUMMARY

Graphene-based materials, electrodes made from the materials, batteries incorporating the electrodes, and methods for making the electrode materials are provided.

One aspect of the invention provides graphene-based materials comprising a plurality of graphene sheets disposed in a vertical stack, wherein graphene sheets within the vertical stack comprise randomly-distributed defect pores formed by in-plane carbon vacancies. In some embodiments of the materials, the graphene sheets are part of a structure comprising a continuous network of graphitic regions comprising crystalline portions of the vertical stack of graphene sheets. In these embodiments, the continuous network of graphitic regions is integrated with a composite comprising: (a) disordered portions of the vertical stack of graphene sheets; and (b) an electrochemically active material, such as silicon nanoparticles, in contact with the graphene sheets in the disordered portions of the vertical stack.

Another aspect of the invention provides lithium ion batteries comprising a cathode, an anode and a non-aqueous electrolyte comprising a lithium salt disposed between the cathode and the anode, wherein the anode comprises a plurality of graphene sheets disposed in a vertical stack, and further wherein graphene sheets within the vertical stack comprise randomly-distributed defect pores formed by in-plane carbon vacancies. In some embodiments of the batteries, the graphene sheets are part of a structure comprising a continuous network of graphitic regions comprising crystalline portions of the vertical stack of graphene sheets, wherein the continuous network of graphitic regions is integrated with a composite comprising: (a) disordered portions of the vertical stack of graphene sheets; and (b) an electrochemically active material, such as silicon nanoparticles, in contact with the graphene sheets in the disordered portions of the vertical stack.

Yet another aspect of the invention provides methods for making an electrode material, the method comprising the steps of: exposing a suspension of exfoliated, oxidized graphene sheets to an acid at an acid concentration high enough, and an exposure time long enough, to generate defect pores formed from carbon vacancies in the oxidized graphene sheets; removing the oxidized graphene sheets from the suspension; and reducing the oxidized graphene sheets to form a vertical stack of graphene sheets having a random distribution of defect pores distributed therein.

Some embodiments of the methods also include the step of mixing the oxidized graphene sheets in suspension with electrochemically active nanoparticles, such that the nanoparticles are dispersed between the graphene sheets. In these embodiments of the present methods, when the oxidized graphene sheets are removed from the suspension and reduced, the resulting material comprises a network of graphitic regions comprising crystalline portions of the vertical stack of graphene sheets integrated with a composite comprising disordered portions of the vertical stack of graphene sheets and nanoparticles of the electrochemically active material dispersed between the graphene sheets in the disordered portions of the vertical stack, the graphene sheets having a random distribution of defect pores distributed therein.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

DETAILED DESCRIPTION

One aspect of the invention provides graphene-based materials. The materials can be designed for use as storage materials in high-power battery applications. The storage materials include vertical stacks of graphene sheets and have reduced resistance for Li ion transport relative to other graphene-based electrode materials. This reduced resistance is achieved by incorporating a random distribution of structural defects into the graphene sheets, whereby the structural defects facilitate the diffusion of Li ions into the interior of the storage materials. Electrochemically active materials, such as silicon can be incorporated into the present structures to provide composite materials that take advantage of the enhanced Li ion diffusion and are able to provide electrodes having high power capabilities and storage capacities, without sacrificing mechanical properties and machinability.

Figure 1:
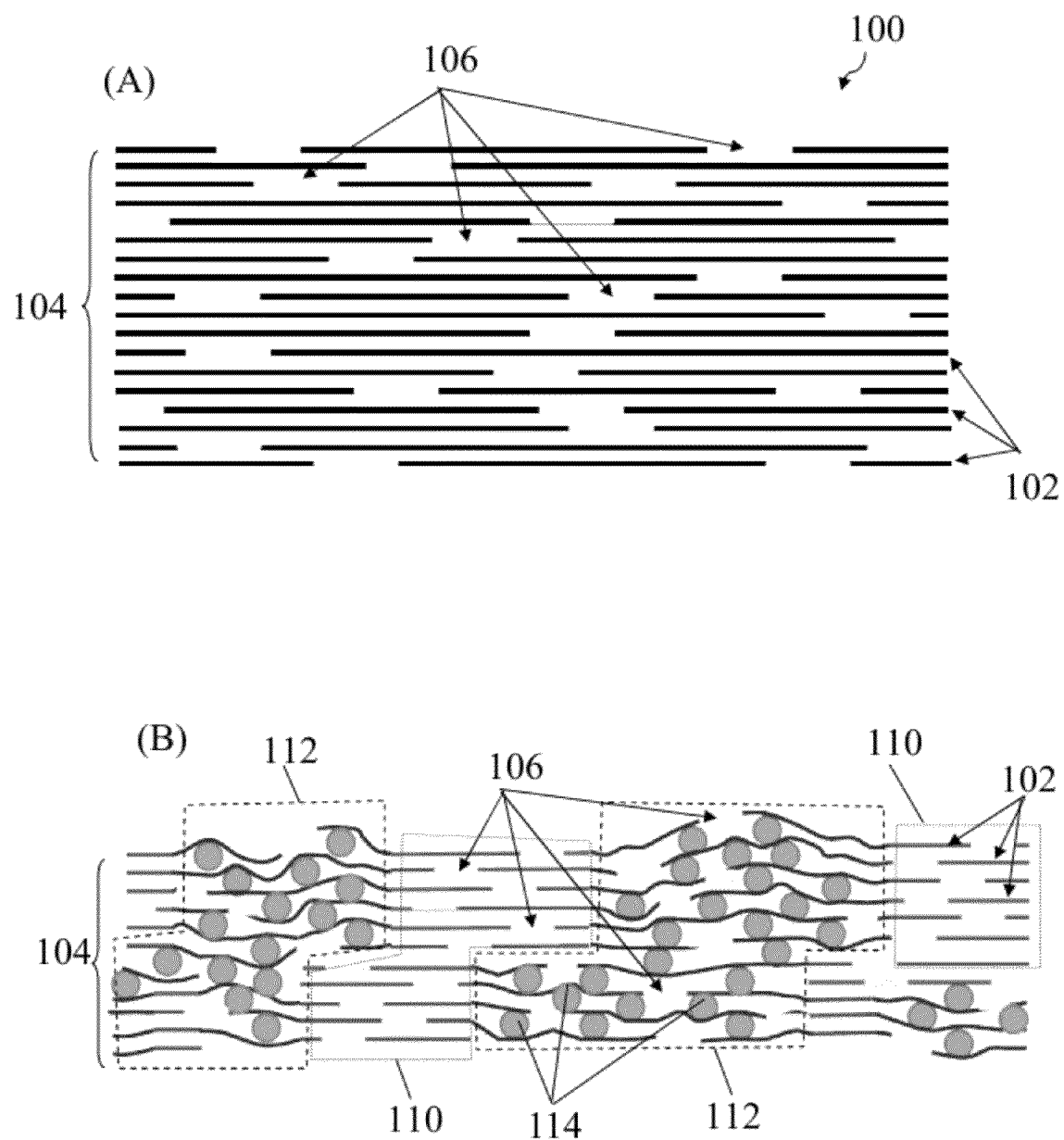
FIG. 1. is a schematic diagram of the cross-section of (A) a vertical stack made of graphene sheets with randomly distributed two-dimensional defect pores and (B) a vertical stack of graphene sheets that includes disordered portions, wherein Si nanoparticles are disposed between graphene sheets, and crystalline portions of ordered graphene sheets. Structural defects in the form of carbon vacancies are distributed through the three-dimensional network. Each broken line represents a single-atom thick graphene sheet with defects (deG). Each group of gray lines represents crystalline portions of the vertical stack. Circles represent Si nanoparticles sandwiched between disordered portions of the graphene sheets, represented by black lines. The disordered portions are structurally connected to the crystalline portions, providing both electrical conductivity and mechanical integrity.

FIG. 1(A) shows a schematic diagram of a cross-sectional view of one embodiment of a graphene-based material 100 in accordance with this invention. The material includes a plurality of graphene sheets 102 disposed in a vertical stack 104, wherein graphene sheets within the vertical stack comprise randomly-distributed defect pores 106 formed by in-plane carbon vacancies.

The graphene-based storage material can be made by exposing a suspension of exfoliated and oxidized graphene sheets to an acid for an exposure time sufficient to generate defect pores (carbon vacancies) in the oxidized graphene sheets. This process may be assisted by agitation methods such as sonication. The oxidized graphene sheets are then removed from the suspension and reduced to provide a vertically-stacked arrangement of graphene sheets having a random distribution of defect pores distributed therein. A more detailed description of a method for making the materials is provided in the Example, below. In some embodiments of the present materials, the graphene sheets in the vertical stack are reconstituted into crystalline graphite. In other embodiments, which are described in greater detail below, the graphene sheets in the vertical stack from a hybrid of crystalline graphite regions intermixed with disordered graphene regions.

Because the carbon vacancies are formed independently in individual graphene sheets prior to the formation of the final vertical stack, the resulting defect pores are "randomly distributed" in that they are neither regularly spaced and/or positioned within a given graphene sheet, nor regularly spaced and/or vertically aligned from graphene sheet to graphene sheet within the vertical stack. Thus, the "randomly distributed" pores are easily distinguishable from holes that are patterned (e.g., lithographically patterned) into stacked graphene materials (e.g., graphite), such that the holes in the graphene sheets are aligned to provide straight channels running vertically through the material.

The dimensions and densities of the defect pores in the graphene sheets of the present materials will depend, at least in part, on the concentration of the acid to which they are exposed and on the duration of the exposure. As such, the dimensions and densities of the defect pores can vary considerably from material to material. By way of illustration only, in some embodiments of the materials, the average defect pore diameter is no greater than about 100 nm. For example, the average defect pore diameter can be in the range from about 1 nm to about 50 nm. Also included are embodiments in which the average defect pore diameter is no greater than about 50 nm and embodiments in which the average defect pore diameter is no greater than about 30 nm. Also by way of illustration only, in some embodiments the density of the pores, as measured by the ratio of the average separation distance between adjacent pores to the average pore diameter, is at least 3. This includes embodiments in which the ratio of the average separation distance between adjacent pores to the average pore diameter is at least 10, at least 50, and at least 100. Thus, in some embodiments, the ratio is from about 3 to about 100. However, higher ratios are also possible.

If the graphene-based materials are to be used for electrical storage, it can be advantageous to incorporate an electrochemically-active material into the structure. One such structure is illustrated in FIG. 1(B). This structure includes a continuous network of graphitic regions comprising crystalline portions 110 of the vertical stack of graphene sheets 102 (rough outlines of two such portions are shown with dotted lines). This continuous network of graphitic regions is integrated with, and in electrical contact with, a composite comprising: (a) disordered portions 112 of the vertical stack of graphene sheets 102 (rough outlines of two such portions are shown with dashed lines); and (b) an electrochemically active material 114 in contact with the graphene sheets in the disordered portions of the vertical stack. In the embodiment depicted in the figure, the electrochemically active material is in the form of nanoparticles distributed between graphene sheets contained within the disordered portion of the structure. For the purposes of this disclosure, the term 'nanoparticles' refers to a collection of particles having an average particle diameter that is no greater than about 1000 nm and includes collection of particles having an average particle diameter of no greater than about 500 nm, or no greater than about 100 nm. Other forms of electrochemically active material, including rods, cubes, and thin films of electrochemically active material disposed on the disordered portions of the graphene sheets, can also be used.

Methods for making graphene-based materials having crystalline portions and disorder portions with an electrochemically active material dispersed therein can be found in Lee et al., *Chem. Commun.*, 2010, 46, 2025-2027, the entire disclosure of which is incorporated herein by reference. A detailed description of a method for making such a structure with randomly-distributed defect pores in the graphene sheets is provided in the Example, below. Briefly, a suspension of exfoliated and oxidized graphene sheets is exposed to an acid for an exposure time sufficient to generate defect pores (carbon vacancies) in the oxidized graphene sheets. The oxidized graphene sheets are mixed with an electrochemically active material, such as silicon nanoparticles, to form a composite material comprising the nanoparticles dispersed between graphene sheets. The composite material is removed from the suspension and reduced to form a vertical stack of graphene sheets in which some portions of the graphene sheets form regions of crystalline graphite, while other portions remain disordered and contain the nanoparticles. The result is a material comprising a continuous network of graphitic regions comprising crystalline portions of the vertical stack of graphene sheets, integrated with, and in electrical communication with, a composite comprising disordered portions of the vertical stack of graphene sheets and nanoparticles of electrochemically active material dispersed between the graphene sheets in the disordered portions. The network of graphite is 'continuous' because continuous sheets of graphene extend through both crystalline and disordered portions to form an integral structure. As such, these structures distinguishable from non-continuous structures wherein electrochemically active nanoparticles are located within pores between graphite flakes, graphite worms or graphite platelets. The present structures are well-suited for use as battery electrodes because they offer the combined advantages of the high electrical conductivity and the structural stability of graphite with the flexibility of graphene sheets, as well as the high Li ion storage capacity of the electrochemically active material.

The crystalline portions of the vertical stack of graphene sheets are electrically conducting, mechanically strong, and easy to prepare from exfoliated graphite. They possess limited Li storage capacities, consistent with carbon-based materials. Since they can be made from a low cost starting material and the preparation process is inexpensive and readily scalable, they are well-suited as supports for high-storage capacity materials.

In the disordered portions of the vertical stack of graphene sheets, the flexibility of the graphene sheets makes it much easier for the material to accommodate volume changes of the electrochemically active material during the charging and discharging cycles of a battery. The extremely high surface area of the graphene sheets provides a large number of contact points with the electrochemically active material and, thus, the ability to maintain electrical contact even when the electrochemically active material undergoes morphological changes and/or agglomeration or fracturing during cycling, thus effectively overcoming one of the principal causes of battery performance degradation (capacity fading).

Suitable electrochemically active materials for use in the present structures include, but are not limited to, Si, Sn, or other monometallic, bimetallic, or multimetallic materials, or oxidic or sulfide materials, or their mixtures. If silicon is chosen as the electrochemically active material, typical loadings for the silicon are in the range of about 30 wt. % to about 80 wt. %. For example, in some embodiments the structures comprise about 50 wt. % to about 70 wt. % silicon. This includes embodiments in which the structures comprise about 55 to about 65 wt. % silicon.

Li ion batteries incorporating the present graphene-based materials are also provided. The batteries include a cathode, an anode and a non-aqueous electrolyte comprising a lithium salt disposed between the cathode and the anode. The anode comprises the above-described graphene-based material. Electrodes made from the present materials are typically no greater than 50 μm thick. This includes embodiments of the electrodes that are no greater than 15 μm thick and further includes embodiments of the electrodes that are no greater than 5 μm thick.

Li ion batteries that incorporate the present graphene-based materials as electrodes can deliver both high energy density and high power density. For example, some embodiments of the battery electrode material can deliver a charge capacity of about 1000 mAh/g at a current of 8 A/g for a period of at least 8 minutes, or a charge capacity of about 3200 mAh/g at a current of 1 A/g for at least 3 hours.

EXAMPLE

This example describes a method for making and characterizing graphene-based materials in accordance with certain embodiments of this invention.

Materials and Methods:

Oxidized Graphene ("GO"): GO was synthesized from flake graphite (Asbury Carbons, 230U Grade, High Carbon Natural Graphite 99) by a modified Hummers method, as described in Kovtyukhova et. al., *Chem. Mater.* 11, 771 (1999); and Hummers et. al., *J. Am. Chem. Soc.* 80, 1339 (1958). Graphite powder (2.0 g) was pre-oxidized by stirring it into a concentrated $H_2SO_4$ (20 mL) solution in which $K_2S_2O_8$ (1.0 g) and $P_2O_5$ (1.0 g) were completely dissolved at 80° C. The mixture, in a beaker, was kept at 80° C. for 4.5 hours (h) using an oil bath. After the mixture was cooled and diluted with 1 L of DDI (distilled, deionized) water, the pretreated product was filtered with a Nylon membrane filter (47 mm diameter, 0.2 μm pore size, Millipore) and washed on the filter until the pH of filtrate water became neutral. The shiny, dark-gray, pre-oxidized graphite was dried in air overnight. Then it was dispersed by stirring into chilled $H_2SO_4$ (75 mL) in an Erlenmeyer flask in an ice bath. $KMnO_4$ (10 g) was added slowly with stirring to keep the temperature of the reaction mixture below 20° C. The resulting thick, dark green paste was allowed to react at 35° C. for 2 h followed by addition of DDI water (160 mL) to form a dark brown solution. To avoid over-flow of the mixture due to rapid temperature rise with foaming by water addition, the flask was chilled in an ice bath and water was added in ~5 mL aliquots with close monitoring of the temperature (kept below 50° C.). After additional stirring for 2 h, the dark brownish solution was further diluted with distilled water (500 mL), and $H_2O_2$ (30%, 8.3 mL) was added slowly. The color of the mixture turned bright yellow. The mixture was allowed to settle overnight. The supernatant was decanted and the remaining product was repeatedly centrifuged and washed with DDI water until the pH of the solution became neutral. (At this stage, the Mn concentration in the supernatant was below 0.1 ppm, as measured by atomic absorption spectroscopy (AAS)). Then, the obtained product was diluted to make a ~0.5% w/w aqueous dispersion for storage.

Introduction of in-plane defect pores into GO sheets: The above aqueous GO suspension was diluted to ~0.1% w/w by DDI water and mixed with an appropriate amount of 70% concentrated $HNO_3$. The mixture was sonicated in a bath sonicator for 1 h. Four different concentrations of $HNO_3$ were tested, corresponding to a GO suspension/70% $HNO_3$ volume ratio of 1:5 (I), 1:7.5 (II), 1:10 (III) and 1:12.5 (IV). The mixture was then poured into 100 mL of water, centrifuged at 20000 rpm and washed with water to remove the acid. The resulting GO materials (referred to as a "paper") containing defects (i.e., carbon vacancies) are referred to as deGO, and were obtained by filtering the resulting purified aqueous suspension through an Anodisc membrane filter (47 mm diameter, 0.2 μm pore size, Whatman), followed by air drying and peeling from the filter.

Reduction of GO papers: Samples of GO or deGO paper were cut by a razor blade into smaller ribbons so as to fit into a quartz tube for thermal reduction. The GO or deGO papers were reduced with either a flow of Ar (~90 ml min$^{-1}$) or 10% hydrogen in Argon (~100 ml min$^{-1}$ total flow) at 700° C. for 1 h. The resulting reduced, vertically-stacked graphene sheets are referred to as G or deG.

Si-graphene paper composites: Si nanoparticles (H-terminated, ~50 nm, Meliorum Nanotechnology, stored in Ar) were removed from an argon glove box and exposed to air overnight to ensure the presence of a hydrophilic oxide layer on the surface. Then the Si nanoparticles were dispersed in 1 mL DDI water by sonication to obtain a homogeneous suspension. A desired amount of the aqueous GO or deG dispersion was added to the suspension of Si nanoparticles and the mixture was sonicated for another 2 h, vacuum-filtered, dried, and thermally reduced as described above. The result was a material comprising a continuous network of graphitic regions comprising crystalline portions of the vertical stack of graphene sheets. The continuous network of graphitic regions was integrated with, and in electrical contact with, a composite comprising disordered portions of the vertical stack of graphene sheets and an electrochemically active material in contact with the graphene sheets in the disordered portion of the vertical stack.

Structural Characterization:

The morphology and thickness of as-prepared (de)GO and (de)G samples were investigated using a Hitachi 5-4800-II field emission scanning electron microscope (FE-SEM) and a JOEL 2100F field emission transmission electron microscope (FE-TEM). To perform ion-exchange of (de)GO with $Pd^{2+}$, an appropriate amount of $Pd(OAc)_2$ was dissolved in DDI water and allowed to settle for hours. After removing the insoluble matter, the supernatant, or further diluted supernatant, of $Pd(OAc)_2$ was stirred with an aqueous (de)GO dispersion overnight. The ion-exchanged (de)GO was loaded onto a sample holder for the Hitachi HD-2300A FE-STEM operated at 200 kV with energy dispersive spectroscopy (EDS) detectors. X-ray diffraction (XRD) patterns of (de)G and Si-(de)G papers were collected by a Scintag XDS2000 diffractometer with $CuK_\alpha$ radiation ($\lambda$=1.5418 Å) at 40 kV, a step size of 0.01° and a step time of 0.5 s. X-ray photoelectron spectroscopy (XPS) of (de)GO and (de)G papers was performed using an Omicron ESCA probe equipped with an electron flood gun. The $AlK_\alpha$ radiation (1486.6 eV) was used as an excitation source and the binding energy scale was calibrated with respect to adventitious carbon (C1s). Thermogravimetric analysis (TGA, Mettler Toledo, TGA/SDTA851$^e$) was performed on crushed Si-(de)G composite papers in air. The samples were heated to 100° C. and held at 100° C. for 10 min to remove any volatiles and adsorbed water. Then the temperature was ramped to 800° C. at the rate of 10° C./min in flowing air. The weight loss, after correcting for oxidation of Si, was used to calculate the carbon content. Separate TGA with bare Si nanoparticles was run at the same conditions to obtain data to correct the weight gain of Si-(de)G composites due to oxidation of Si nanoparticles in air. Sheet resistance and conductivity measurements were made with a four-point probe technique with an electrode separation of 1 mm using a Keithley 2400 source meter.

Electrochemical Tests:

Electrochemical measurements were carried out on (de)G papers using two-electrode coin cells with Li metal as the counter electrode. The (de)G working electrodes were typically 0.2-0.3 mg cm$^{-2}$ and ~5 μm thick. Microporous glass-fiber membrane (Whatman) was used as separator, and a Cu foil (99.999%, 0.025 mm thick, Alfa-Aesar) was employed to connect the (de)G papers to external leads. The electrolyte consisted of 1 M $LiPF_6$ in ethylene carbonate (EC)/dimethyl carbonate (DMC) (1:1, v/v). The cells were assembled in an argon-filled glove box, and galvanostatic measurements were conducted with a BT2000 Potentiostat/Galvanostat system (Arbin Instruments) at various current densities, typically in the voltage range of 0.02-1.5 V vs. Li/Li$^+$. Electrochemical measurements of Si-(de)G composite papers were carried out using three-electrode Swagelok-type cells, with a Li metal reference electrode that was separated from a Li metal counter electrode. The thin Si-(de)G composite electrodes were ~1 mg/cm$^2$ and 5 μm thick, and the thick Si-(de)G composite electrodes were ~4 mg/cm$^2$ and 20 μm thick. They were placed on stainless steel plungers with or without Cu foils in between in the Swagelok-type cells. Electrochemical cycling of Si-(de)G composite electrodes was performed using two different procedures, either at various current densities in the voltage range of 0.02-2 V vs. Li/Li$^+$ or a constant current-constant voltage (CCCV) method. In the CCCV method, during lithiation, the current was held at 1000 mA/g until the potential drop to 20 mV. After reaching 20 mV, the potential was held constant until the current was decreased from 1000 mA/g to 50 mA/g. During delithiation, the current was held at 1000 mA/g while the potential was increased to 1.5 V, at which point the potential was held at 1.5 V until the current decreased to 50 mA/g. Additionally, fast rate tests were also performed on Si-deG-II composite electrodes using cut-off voltages of 0.02-1.5 V at currents from 1000 mA/g to 8000 mA/g. Electrochemical impedance spectroscopy (EIS) measurements were conducted on two-electrode Swagelok-type cells with a Li metal counter electrode and 120 μL of the above electrolyte. Data were collected using a Solartron 1260 impedance analyzer coupled with a Solartron 1286 electrochemical interface by applying an AC voltage of 10 mV amplitude and DC open circuit voltage (OCV) in the frequency range of 1 MHz-0.01 Hz at room temperature.

Figure 2:
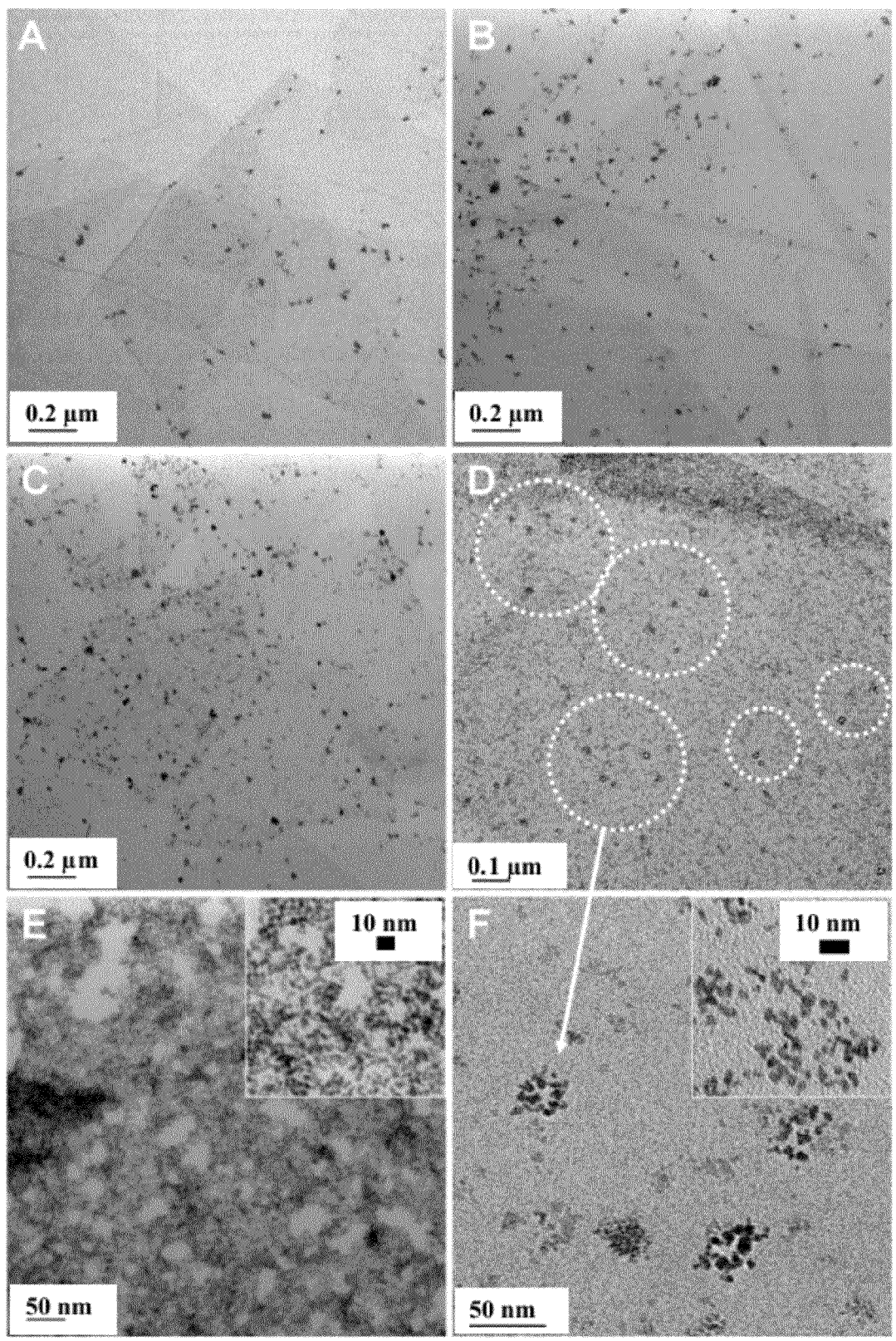
FIG. 2. Transmission electron microscope (TEM) images of Pd-stained samples (see Example): (A) GO, (B) deGO-I, (C) deGO-II, (D) deGO-III, and (E) deGO-IV. (F) A high magnification image of a highlighted region in D, showing ~3 nm Pd particles in ring-like arrangements, a result of Pd ion binding to carboxylate at defect perimeters.

Results:

Structural Characterization: The acid-sonication treatment created carbon vacancies with carboxylate groups decorating the defect edge sites. The carboxylates, via electrostatic interaction with heavy metals such as Pd ions, were utilized to examine the dependence of defect generation on the severity of the acid-oxidation treatment. Pd nanoparticles, formed by reduction of Pd ions with electron beam, are easily observable with electron microscopy. FIG. 2A-E show the bright field TEM images of GO and deGOs. The density of Pd particles on deGO increased with increasing severity of acid treatment. For samples III and IV, clusters of Pd nanoparticles were readily detected. A high-magnification image of deGO-III (FIG. 2F) shows that the Pd clusters gathered in rings, consistent with them located at the perimeter of the pore-like defects. Many of the observable pores were 10-20 nm in diameter. The most severely treated deGO-IV displayed a higher density of larger pores (FIG. 2E). These observations are in agreement with X-ray photoelectron spectroscopic (XPS) measurements which showed that the acid-oxidation treatment increased the peak area of oxygen functional groups relative to aromatic carbon. Large micron-size defects could also be detected by SEM on the more severely treated samples.

In contrast to the deGO, deG had little capacity to bind Pd ions, making observation of defects, other than large pores, by electron microscopy more challenging. The largest pores observed were roughly <10 nm, 20 nm, 100 nm, and >100 nm for samples I, II, III, and IV, respectively.

Figure 3:
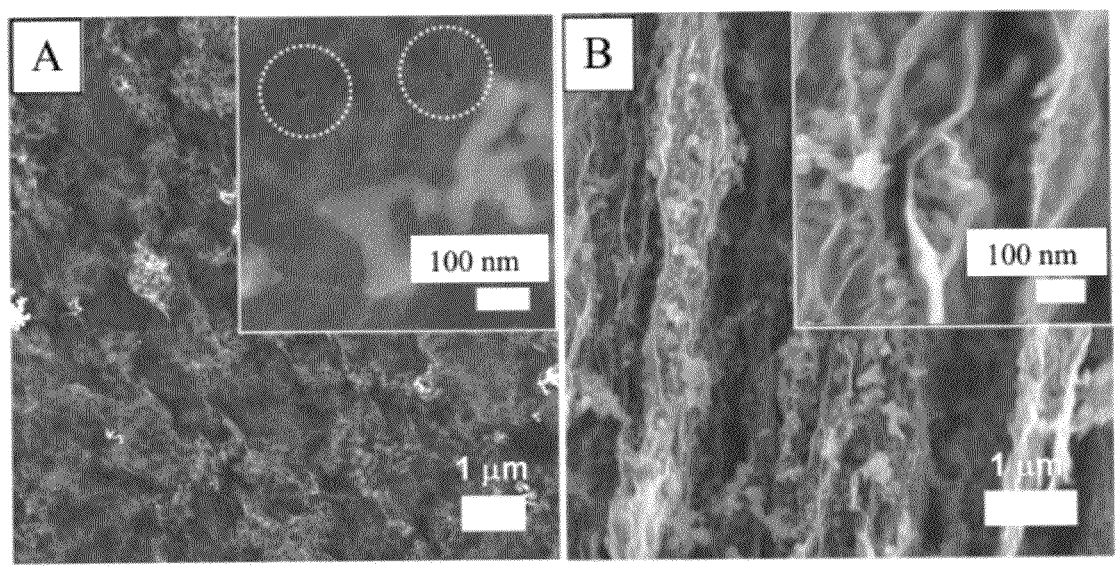
FIG. 3. (A) Scanning electron microscope (SEM) image of the top surface of a Si-deG-III paper (see Example). Circles in the inset highlight in-plane defects. (B) SEM image of the cross-section of a Si-deG-III paper. Insets show Si nanoparticles embedded between graphene sheets uniformly.

Both Si-deGO and Si-deG papers containing 65-70 wt % Si were flexible and X-ray diffraction confirmed the presence of both crystalline graphite domains and disordered regions. SEM images revealed homogeneously dispersed Si nanoparticles sandwiched between graphene sheets (FIGS. 3A and B).

Electrochemical Properties: A ~5 μm thick Ar-reduced Si-deG-II paper cycled between 0.02-1.5 V (vs. Li/Li$^+$) at 1 A/g exhibited a reversible capacity close to its theoretical value of ~3200 mAh/g after 5 cycles. Thereafter, the capacity loss was only 0.14% per cycle, such that 83% of its theoretical capacity was maintained after 150 cycles. The initial irreversible capacity losses were mostly due to the formation of solid electrolyte interphase (SEI) and reactions of Li with residual O and H-containing groups in graphene. When tested at 8 A/g, a reversible capacity of ~1100 mAh/g was obtained, which degraded at ~0.34% per cycle for 150 cycles. This specific current corresponded to a rate of ~8 C based on the accessible storage capacity, or ~2.6 C based on the theoretical capacity; hence referred to as theoretical C-rate. The characteristic voltage plateaus for phase transformation of amorphous Si at 0.3-0.17 V and 0.1-0.05 V (lithiation), and 0.2-0.4 V and 0.45-0.58 V (delithiation) remained distinguishable even at such high rates. Capacity fade could be reduced by cycling through a narrower range of 0.1-0.55V to minimize the destructive effect of volume variation and possible dissolution and re-formation of SEI at high voltages. At 4 A/g (~1.3 C theoretical), capacity fade was ~0.1% per cycle, and a reversible capacity of ~600 mAh/g was maintained after 150 cycles. Stable storage capacity and reversibility were observed when the rate was first stepwise increased from 0.1 to 8 mA/g and then decreased.

The ability to maintain high capacity at high rates for the Si-deG samples was due to enhanced Li ion diffusion. This was confirmed by electrochemical impedance spectroscopy. Nyquist plots of Si-deG showed a pronounced reduction in both the charge-transfer resistance and the Warburg coefficient compared with Si-G, whereas the constant phase element increased gradually, implying a more capacitive interface.

The ultrahigh charge storage capacity at high charge/discharge rates of the Si-deG composites indicate that they can function as stable anodes for high-power battery applications. If a Si-deG anode can be coupled with a cathode that has a comparable capacity to form a 3 V battery, and assuming the total active storage materials in this battery account for 20% of the total weight, the battery could deliver 2.4 kW/kg power and 330 Wh/kg energy for 8 min. Alternatively, it could deliver 300 W/kg power and 900 Wh/kg energy for 180 min. These values are equivalent to a 400 kg (880 lb) engine providing 0.96 MW power (~1290 hp) for 8 min, or 120 kW (~160 hp) for 180 min. This unprecedented combination of energy and power capability can meet the requirements for the electrification of a wide range of transportation systems.

Defect size and density of the Si-deG composites influence capacity and rate capabilities, while treatment in Ar or $H_2$ had minor effects. Si-deG-II was the most tolerant to high rates, maintaining 34% of theoretical capacity at 8 A/g. Improved rate capability due to improved ion diffusivity was observed also with graphite papers formed by reconstituting graphene sheets with induced defects. The best sample tested exhibited 180 mAh/g capacity at a current of 2 A/g with excellent cycling stability.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, the use of "and" or "or" is intended to include "and/or" unless specifically indicated otherwise.

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A graphene-based material comprising a plurality of graphene sheets disposed in a vertical stack, wherein graphene sheets within the vertical stack comprise randomly-distributed two-dimensional defect pores in the plane of the graphene sheet, the defect pores comprising in-plane carbon vacancies in the graphene structure, and further wherein at least a portion of the plurality of graphene sheets form a crystalline graphite structure.

2. The material of claim 1, wherein the average diameter of the defect pores is in the range from about 1 nm to about 100 nm.

3. The material of claim 1, wherein the average diameter of the defect pores is no greater than 30 nm.

4. The material of claim 1, wherein the graphene sheets are part of a structure comprising a continuous network of graphitic regions comprising crystalline portions of the vertical stack of graphene sheets, and further wherein the continuous network of graphitic regions is integrated with a composite comprising: (a) disordered portions of the vertical stack of graphene sheets; and (b) an electrochemically active material in contact with the graphene sheets in the disordered portions of the vertical stack.

5. The material of claim 4, wherein the electrochemically active material is silicon.

6. The material of claim 5, wherein the silicon is in the form of silicon nanoparticles dispersed between the graphene sheets in the disordered portions of the vertical stack.

7. A lithium ion battery comprising a cathode, an anode and a non-aqueous electrolyte comprising a lithium salt disposed between the cathode and the anode, wherein the anode comprises a plurality of graphene sheets disposed in a vertical stack in which at least a portion of the plurality of graphene sheets form a crystalline graphite structure, and further wherein graphene sheets within the vertical stack comprise randomly-distributed two-dimensional defect pores in the plane of the graphene sheet, the defect pores comprising in-plane carbon vacancies in the graphene structure.

8. The lithium ion battery of claim 7, wherein the average diameter of the defect pores is in the range from about 1 nm to about 100 nm.

9. The lithium ion battery of claim 7, wherein the graphene sheets are part of a structure comprising a continuous network of graphitic regions comprising crystalline portions of the vertical stack of graphene sheets, and further wherein the continuous network of graphitic regions is integrated with a composite comprising: (a) disordered portions of the vertical stack of graphene sheets; and (b) an electrochemically active material in contact with the graphene sheets in the disordered portions of the vertical stack.

10. The lithium ion battery of claim 9, wherein the electrochemically active material comprises nanoparticles dispersed between the graphene sheets in the disordered portions of the vertical stack.

11. The lithium ion battery of claim 10, wherein the nanoparticles are silicon nanoparticles.

12. The lithium ion battery of claim 9, wherein the battery can deliver a power density of at least 2 kW/kg and an energy density of at least 300 Wh/kg for a period of at least 8 minutes.

13. The material of claim 1, wherein the defect pores include defect pores having diameters in the range from 10 to 20 nm.

14. The material of claim 1, wherein the defect pores include defect pores having diameters greater than 100 nm.

15. The material of claim 1, wherein the defect pores include defect pores having diameters in the range from 20 nm to 100 nm.

16. The material of claim 1, comprising eleven graphene sheets disposed in the vertical stack.

17. The lithium ion battery of claim 7, wherein the defect pores include defect pores having diameters in the range from 10 to 20 nm.

18. The lithium ion battery of claim 7, wherein the defect pores include defect pores having diameters greater than 100 nm.

19. The lithium ion battery of claim 7, wherein the defect pores include defect pores having diameters in the range from 20 nm to 100 nm.

20. The lithium ion battery of claim 19, wherein the diameters are measured using field emission transmission electron microscopy.

21. The lithium ion battery of claim 7, wherein the defect pores enhance the diffusion of lithium ions into the interior of the vertical stack of graphene sheets relative to that of the vertical stack of graphene sheets in the absence of the defect pores.

* * * * *